Bolles, Prescott & Bickford,
Cotton Press.
N°. 1,979.        Patented Feb. 13, 1841.
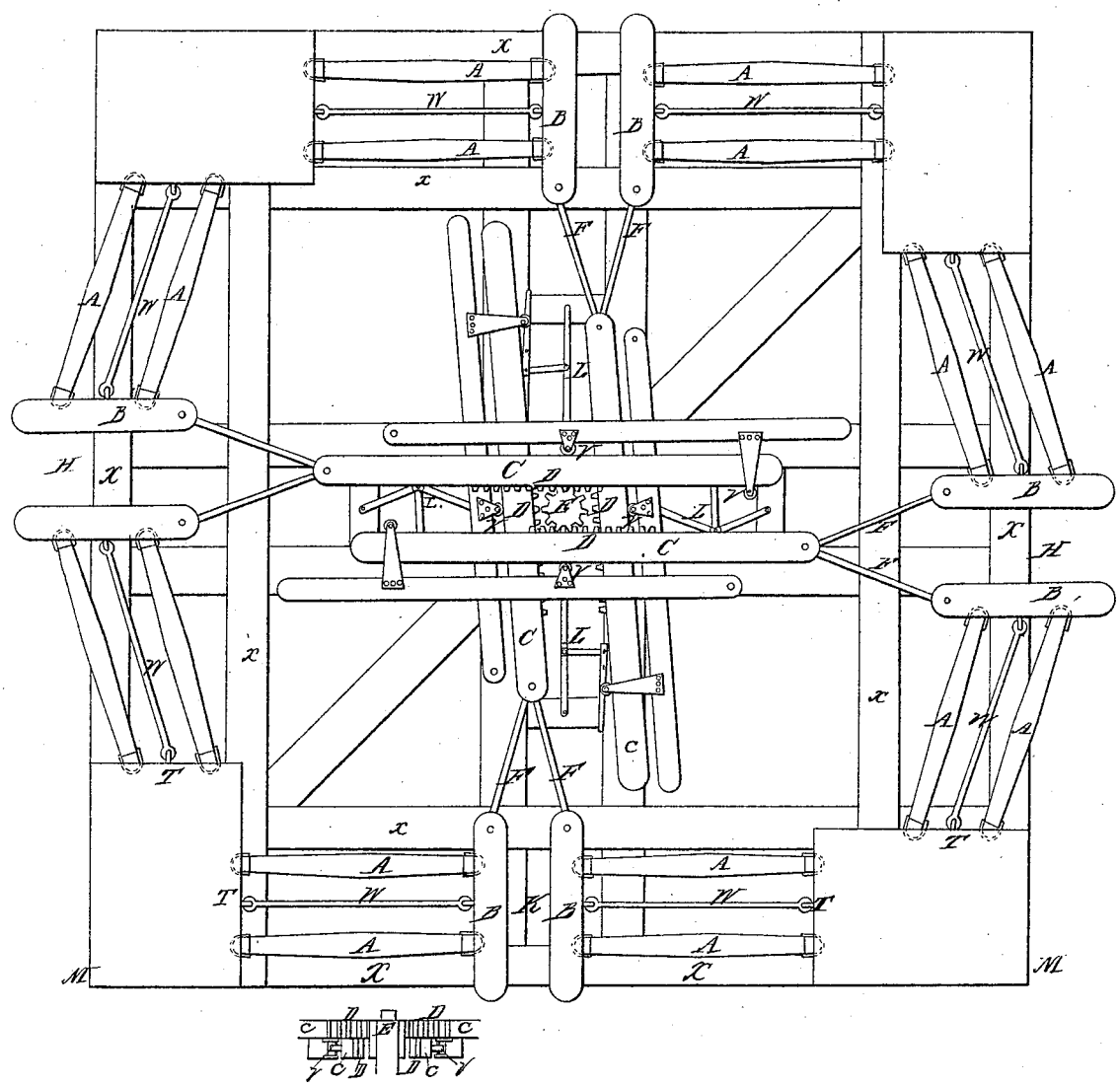

UNITED STATES PATENT OFFICE.

LEMUEL BOLLES, JEDEDIAH PRESCOTT, AND WILLIAM A. BICKFORD, OF MEMPHIS, TENNESSEE.

IMPROVEMENT IN THE MANNER OF CONSTRUCTING PRESSES FOR COTTON, HAY, &c.

Specification forming part of Letters Patent No. 1,979, dated February 13, 1841.

*To all whom it may concern:*

Be it known that we, LEMUEL BOLLES, JEDEDIAH PRESCOTT, and WILLIAM A. BICKFORD, of Memphis, in the county of Shelby and State of Tennessee, have invented a new and useful Machine for Pressing and Compressing Cotton and other Commodities; and we do hereby declare that the following is a full and exact description.

Our invention consists in the combination of joint-levers with press-blocks, abutments, racks and pinion, &c., as herein described, in such a form as to adapt them to the use of compressing cotton and other substances. We use any length of lever we choose, which may be longer or shorter, as we may wish to increase or decrease the power. The power is obtained from the joint-levers we use on the same principle of the hand printing-press, only operating differently, as our levers are fixed at their extreme ends, (moving only in their joints or sockets,) and giving the impression between the contiguous ends of the levers; but the printing-press levers are united by a knuckle-joint, and only one extreme end (the upper end) fixed and the other movable. Our levers do not, like those of the printing-press, operate perpendicularly, but are horizontally arranged and move back and forth on a level plane, and to describe their operation more clearly we will conceive two doors hung on their opposite jambs, both swinging toward the center of the door. Now, when nearly closed, if we throw between them an elastic substance and close them up in a right line, they would gear, in proportion to their solidity, a powerful impression. This is the principle on which our levers operate; but as a cotton bale is about five feet long, two feet thick, and three and one-half feet wide, it is necessary to have at least four levers to each press, with a pair of jaws or press-blocks fixed with socket-joints to their ends, and with these press-blocks we can press the whole surface of the bale of cotton. Now, to illustrate this, we will conceive four doors—two on either side—and when all are closed (hung as before described) there will be a space of one foot between them. Now, suppose we take three inches off the meeting stiles of all the doors, we shall have a space of six inches, where we will conceive a bale of cotton compressed, provided there be a piece of plank (press-block B) between the bale on either side and the two doors, (levers A A,) by which the whole surface of the bale can be compressed. Our levers are made about eighteen inches deep, six inches thick in the middle, and three inches at their ends, which are strapped with thick sheet-iron, and are fitted into socket-joints cut in the press-blocks B B and the abutments T T. The door-jambs before described represent the abutments T T. The doors, the levers, and the pieces of plank between the bale and the doors represent the press-blocks B B. Now, as we swing the doors open to receive the bale, those pieces of plank or press-blocks, being confined by joints to the doors, will keep parallel and operate similar to a parallel rule, used in drawing. The press-blocks B B are made of durable wood, five feet long, two feet deep, and eighteen inches thick, and are connected to the levers A A by socket-joints and confined to the abutments by a chain, W, similar to the hog-chain used in steamboats, the chain being fastened by an eyebolt at one end to the press-block B (between the levers) and the other end to the center of abutment T, and may be tightened by turning the screw.

The abutments T T must be permanent, and may be constructed in various ways. Strong massive walls of brick or stone might be used where a permanent building is desired, and this is in accordance with the model, (received June 11, 1838.) But the cheaper mode of construction is to make a frame-work of timbers, and they may be made to accommodate four presses in a space of forty feet square, (or, if more power be required, say sixty feet square.)

To construct this frame, we take four pieces of timber, X, eighteen inches square and forty feet long, and frame them into sills, forming a perfect square, the ends being locked and bolted together. Secondly, we frame four other pieces, x, of timber of the same size into inside sills, which are in the same form of the outside sills, (being a square within a square;) but the inside sills being as long as the outside, they are locked across the outside, and also each other about three feet from their ends; hence we have a foundation of forty feet square, with two parallel sills, X x, on either side, two feet apart, and all locked together and bolted, and all on a horizontal plane with each other. Now, to form our abutment-barriers, we frame four posts, eighteen inches by two feet, into each corner of our frame-work or sills in such a manner that two of them will stand behind each abutment T (or door-jamb) and plates framed onto the tops of these posts, which serve the double purpose of supporting the roof of the building and preventing the levers from forcing the abutments asunder. Our abutments are made of pieces of durable wood, (corresponding precisely with the press-blocks B,) and are bolted permanently to the foot of the posts M. The frame herein described will accommodate four presses. The abutments are fixed in every corner, and the press-blocks B B work back and forth horizontally, about five feet, moving on smooth ways let into the sills near the center of each side of the square. Now, we have the abutments, the levers, and the press-blocks all combined, two presses on either side of the frame-work, forming a hollow square. To give all these presses motion we frame two large timbers, eighteen inches square, into the inside sills, before described, in such a form as to cross each other at right angles in the center of the hollow square, and of course their ends will intersect the inside sills near the location of the press-block B B, and braces are formed into the inside and these last cross-sills in any manner to strengthen the frame-work. The braces, outside, inside, and center sills are all exactly horizontal with each other. We next place a cast-iron pinion-wheel (two-inch cog and four-inch pitch) in the center of the building, where those intermediate sills cross each other at right angles. This pinion E is fastened on the top of a cast-iron shaft, (with an eight-inch journal,) which descends to the basement-story, where it may be propelled by any applicable power whatever. This pinion-wheel E works into racks D D, and in order to make one pinion work four presses we make the cog of pinion eighteen inches long and that of the racks nine inches, so that two racks can work across the other two at right angles, being so arranged that the two under racks may work into the lower half and the two upper racks may work into the upper half of the pinion-wheel. The rack D is bolted onto a piece of wood nine inches square, C, which extends to within five feet of the press-blocks B B, and is connected to them by iron rods F, two inches square, fastened by eye-bolts to the ends of the press-blocks B, and united to tiller C with a joint and iron bolt. The tillers are thrown in and out of gear at pleasure by means of small joint-levers L (similar to those used in the hand printing-press) and the use of friction-pulleys.

The jaws of the presses or press-blocks B B may be thrown open to receive the bale to be compressed by means of pulleys and weights or other suitable means. The presses may operate singly or all together. The space between the press-blocks, when drawn together, should be exactly what the bale of cotton should occupy when compressed, K, and they should be thrown open sufficient to receive the largest bale H. Our pinion-wheel shaft may be geared, should more power and less speed be required.

What we claim as our invention, and desire to secure by Letters Patent, is—

The mode herein described of compressing cotton and other substances by means of the joint-levers A A, connected with the abutments T T and the press-blocks B B, and the combination of the rack and pinion D and E with tiller C and connecting-rods F, operating substantially in the manner herein described and set forth.

LEMUEL BOLLES.
JEDEDIAH PRESCOTT.
W. A. BICKFORD.

Witnesses:
JOSEPH WILLIAMS,
M. W. NELSON.